United States Patent
Cheng et al.

(10) Patent No.: US 11,468,262 B2
(45) Date of Patent: Oct. 11, 2022

(54) DEEP NETWORK EMBEDDING WITH ADVERSARIAL REGULARIZATION

(71) Applicant: NEC Laboratories America, Inc., Princeton, NJ (US)

(72) Inventors: Wei Cheng, Princeton Junction, NJ (US); Haifeng Chen, West Windsor, NJ (US); Kenji Yoshihira, Princeton Junction, NJ (US); Wenchao Yu, Albany, CA (US)

(73) Assignee: NEC Corporation

( * ) Notice: Subject to any disclaimer, the term of this patent is extended or adjusted under 35 U.S.C. 154(b) by 1023 days.

(21) Appl. No.: 16/169,184

(22) Filed: Oct. 24, 2018

(65) Prior Publication Data

US 2019/0130212 A1   May 2, 2019

Related U.S. Application Data

(60) Provisional application No. 62/578,565, filed on Oct. 30, 2017.

(51) Int. Cl.
*G06K 9/62* (2022.01)
*G06N 3/04* (2006.01)
(Continued)

(52) U.S. Cl.
CPC .......... *G06K 9/6252* (2013.01); *G06K 9/627* (2013.01); *G06K 9/6215* (2013.01); *G06K 9/6251* (2013.01); *G06N 3/04* (2013.01); *G06N 3/0445* (2013.01); *G06N 3/0454* (2013.01); *G06N 3/0472* (2013.01); *G06N 3/084* (2013.01); *G06V 10/454* (2022.01)

(58) Field of Classification Search
CPC .. G06K 9/6252; G06K 9/6215; G06K 9/6251; G06K 9/627; G06N 3/04; G06N 3/0445; G06N 3/0454; G06N 3/0472; G06N 3/084; G06V 10/454; G06V 10/82
See application file for complete search history.

(56) References Cited

U.S. PATENT DOCUMENTS 9,928,448 B1 *  3/2018  Merler .................. G06V 20/35
10,373,055 B1 *  8/2019  Matthey-de-l'Endroit .................
                                                         G06N 3/0454
(Continued)

OTHER PUBLICATIONS

Nagabushan, "A Wizard's Guide to Adversarial Autoencoders, Part 2", Aug. 7, 2017) (Year: 2017).*

(Continued)

*Primary Examiner* — Alexey Shmatov
*Assistant Examiner* — Michael Aaron Merabi
(74) *Attorney, Agent, or Firm* — Joseph Kolodka (57) ABSTRACT

Methods and systems for embedding a network in a latent space include generating a representation of an input network graph in the latent space using an autoencoder model and generating a representation of a set of noise samples in the latent space using a generator model. A discriminator model discriminates between the representation of the input network graph and the representation of the set of noise samples. The autoencoder model, the generator model, and the discriminator model are jointly trained by minimizing a joint loss function that includes parameters for each model. A final representation of the input network graph is generated using the trained autoencoder model.

16 Claims, 8 Drawing Sheets

(51) Int. Cl.
G06N 3/08 (2006.01)
G06V 10/44 (2022.01)

(56) References Cited

U.S. PATENT DOCUMENTS

| | | | | |
|---|---|---|---|---|
| 10,652,565 | B1* | 5/2020 | Zhang | H04N 19/463 |
| 10,984,315 | B2* | 4/2021 | Zarar | G06N 3/08 |
| 11,080,587 | B2* | 8/2021 | Gregor | G06N 3/0454 |
| 2017/0293836 | A1* | 10/2017 | Li | G06N 3/0445 |
| 2019/0012581 | A1* | 1/2019 | Honkala | G06N 3/0472 |
| 2019/0080205 | A1* | 3/2019 | Kaufhold | G06N 3/0472 |

OTHER PUBLICATIONS

Berg, "Graph Convolutional Matrix Completion", Oct. 25, 2017) (Year: 2017).*
Wei Cheng et al., Ranking Causal Anomalies via Temporal and Dynamical Analysis on Vanishing Correlations, KDD, San Francisco, CA, Aug. 13-17, 2016.
Aditya Grover et al., node2vec: Scalable feature learning for networks, In Proceedings of the 22nd ACM SIGKDD international conference on Knowledge discovery and data mining. ACM, Aug. 2016.
Shaan Gulrajani et al., Improved training of wasserstein gans. arXiv preprint arXiv: 1704.00028, Dec. 2017.
Tomas Mikolov et al., Distributed representations of words and phrases and their compositionality. In Advances in neural information processing systems, Oct. 2013.
Bryan Perozzi et al., Deepwalk: Online learning of social representations. In Proceedings of the 20th ACM SIGKDD international conference on Knowledge discovery and data mining. Jun. 2014.
Sam T. Roweis et al., Nonlinear dimensionality reduction by locally linear embedding. Science 290, Dec. 2000.
Lei Tang et al., Leveraging social media networks for classification. Data Mining and Knowledge Discovery 23, Jan. 2011.
Daixin Wang et al., Structural deep network embedding. In Proceedings of the 22nd ACM SIGKDD international conference on Knowledge discovery and data mining. ACM, Aug. 2016.
Wenchao Yu et al., Learning Deep Network Representations with Adversarially Regularized Autoencoders, KDD, London, United Kingdom, Aug. 19-23, 2018.

* cited by examiner

FIG. 1

Model Training

Require: the walks generated from input graph, maximum training epoch $n_{epoch}$, the number of discriminator training per generator iteration $n_D$.

1: for $epoch = 0; epoch < n_{epoch}$ do
2:     Minimizing $\mathcal{L}_{LE}(\phi; x)$ with autoencoder $\mathcal{L}_{AE}(\phi, \psi; x)$
3:     Sample $\{x^{(i)}\}_{i=1}^{B} \sim \mathbb{P}_{data}(x)$ a batch from the walks
4:     Compute latent representation $f_\phi(x^{(i)})$
5:     Compute reconstruction output $h_\psi(f_\phi(x^{(i)}))$
6:     Compute $\mathcal{L}_{AE}(\phi, \psi)$ and $\mathcal{L}_{LE}(\phi)$
7:     Backpropagate loss and update $\phi$ and $\psi$
8:
9:     Discriminator training
10:     for $n = 0, n < n_D$ do
11:         Sample $\{x^{(i)}\}_{i=1}^{B} \sim \mathbb{P}_{data}(x)$ a batch from the walks
12:         Sample $\{z^{(i)}\}_{i=1}^{B} \sim \mathbb{P}_g(z)$ a batch from the noise
13:         Compute representations $f_\phi(x^{(i)})$ and $g_\theta(z^{(i)})$
14:         Compute $\mathcal{L}_{DIS}(w)$ using
15:         Backpropagate loss and update $w$
16:         clip the weight $w$ within $[-c, c]$
17:     end for
18:
19:     Generator training
20:     Sample $\{z^{(i)}\}_{i=1}^{B} \sim \mathbb{P}_g(z)$ a batch from the noise
21:     Compute the representation $g_\theta(z^{(i)})$
22:     Compute $\mathcal{L}_{GEN}(\theta)$ using
23:     Backpropagate loss and update $\theta$
24: end for

//DEEP NETWORK EMBEDDING WITH ADVERSARIAL REGULARIZATION

RELATED APPLICATION INFORMATION

This application claims priority to U.S. Provisional Appl. No. 62/578,565, filed on Oct. 30, 2017, incorporated herein by reference herein its entirety.

BACKGROUND

Technical Field

The present invention relates to machine learning and, more particularly, to network embedding in machine learning models.

Description of the Related Art

Network embedding seeks to map between nodes in a network (e.g., a graph with nodes and edges) and a low-dimensional representation. For example, given a graph input, the network embedding can represent each node in the graph as a point in an n-dimensional space. The embedded representation of the network can then be used to perform a variety of analytical tasks. Existing approaches to network embedding suffer from a variety of drawbacks, including an inability to capture non-linear properties of the network, fail to capture high-order information of the network, or involve the time-consuming tuning of parameters.

SUMMARY

A method for embedding a network in a latent space includes generating a representation of an input network graph in the latent space using an autoencoder model and generating a representation of a set of noise samples in the latent space using a generator model. A discriminator model discriminates between the representation of the input network graph and the representation of the set of noise samples. The autoencoder model, the generator model, and the discriminator model are jointly trained by minimizing a joint loss function that includes parameters for each model. A final representation of the input network graph is generated using the trained autoencoder model.

A system for embedding a network in a latent space includes an auto-encoder configured to generate a representation of an input network graph in the latent space using an autoencoder model and to generate a final representation of the input network graph after the autoencoder model has been trained. A generator is configured to generate a representation of a set of noise samples in the latent space using a generator model. A discriminator is configured to discriminate between the representation of the input network graph and the representation of the set of noise samples using a discriminator model. A training module includes a processor configured to jointly train the autoencoder model, the generator model, and the discriminator model by minimizing a joint loss function that includes parameters for each model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide network embedding using adversarial regularization. These embodiments do not predefine an explicit density distribution for hidden representations, but can still represent distributions confined to a low-dimensional manifold. Vertex representations are learned through both locality-preserving and global reconstruction constraints and are regularized by generative adversarial training. The present embodiments thereby learn smooth, regularized vertex representations while still capturing the underlying network structure.

A result is that the present embodiments substantially improve the accuracy of network structure information embedding. The resulting embedded representations can be used, for example, in network reconstruction, link prediction, multi-label node classification, etc. For network reconstruction, node vectors learned from the network embedding maintain the edge information from the original graph and can be used to reconstruct the original graph. For link prediction, missing edges are inferred based on the network structure information. Link prediction can thus be used to repair a broken data set by inferring the lost connections between nodes. In other embodiments, link prediction can be used to suggest connections between nodes in the network. This has an immediately apparent application in social networks, where connections between users can be selected by recognizing their clusters in the latent space. Other fields that benefit from network analysis, and that therefore benefit from the more accurate embeddings provided by the present embodiments, include protein-protein interactions and language networks.

Thus, the present embodiments jointly minimize a locality-preserving loss function and the reconstruction error of an autoencoder using, e.g., a long-short term memory (LSTM) network as an encoder. This joint embedding inference is encapsulated in a generative adversarial training process so that no explicit prior distribution is needed. A discrete LSTM autoencoder is used to learn continuous vertex representations with sampled sequences of vertices as inputs. Besides minimizing the reconstruction error in the LSTM autoencoder, the locality-preserving loss at the hidden layer is also minimized. Meanwhile, a continuous spacer generator is trained by constraining to agree with in distribution with the encoder. Generative adversarial training is treated as a complementary regularizer to the network embedding process.

In one example, where the present embodiments are used to perform link prediction to reproduce a network after half of the edges have been removed, an improvement of 3% to 32% was demonstrated across multiple datasets when an area-under-curve score was used to evaluate the performance of the present embodiments when compared to several conventional link prediction systems.

For network reconstruction, network embeddings are effective representations of the original network. The vertex representations learned by the network embedding maintain the edge information for network reconstruction. Randomly selecting vertex pairs as edge candidates, the Euclidean distance can be calculated between the vertices. Taking the fraction of correct predictions in the top k predictions in a network reconstruction test, the present embodiments provide higher precision than any conventional embedding.

The task of multi-label classification, meanwhile, predicts vertex labels with representations learned by network embedding. This task is widely used for performance evaluation. An effective network embedding process captures network topology and extracts the most useful features for downstream machine learning tasks. The present embodiments outperform conventional embedding processes in multi-label classification, achieving higher scores on the Micro-F1 metric by at least 10% across all experimental settings.

Figure 1:
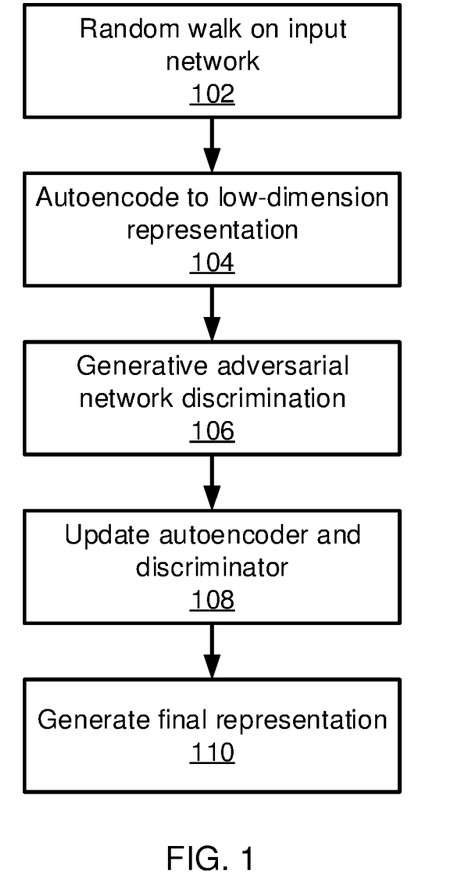
FIG. 1 is a block/flow diagram of a method for generating a network representation in accordance with an embodiment of the present invention.

Referring now to FIG. 1, a method of performing network embedding is shown. An input graph is represented as G(V,E), where V represents the set of nodes in the graph and E represents the set of edges in the graph, each edge connecting two nodes from V. It should be understood that the graph G can be either directed or undirected. In the case of a directed graph, each edge in E will have an associated direction from one connected node to the other. Block 102 uses a random walk generator on the graph G to obtain a set of random walks that are rooted on nodes in the graph. Each random walk samples from the neighbors of the last-visited node until a preset maximum length 1 is reached. This process preserves the localized properties of the graph, providing an information corpus for later generative adversarial network (GAN) training.

Block 104 then performs autoencoding on the network graph. An autoencoder neural network is trained to set target values to be equal to its inputs. The network includes an encoder, $f_\phi(\cdot)$, that maps inputs ($x \in \mathbb{R}^n$) to latent low-dimensional representations and a decoder, $h_\psi(\cdot)$, that produces a reconstruction of the inputs. Thus, given a data distribution $\mathbb{P}_{data}$, from which x is drawn (e.g., $x \sim \mathbb{P}_{data}(x)$), representations $f_\phi(x)$ are learned such that the output hypotheses $h_\psi(f_\phi(x))$ are approximately equal to x. The learning process is described herein as minimizing a cost function:

$$\min \mathbb{E}_{x \sim \mathbb{P}_{data}(x)} [\text{dist}(x, h_\psi(f_\phi(x)))]$$

where dist(•) is any appropriate similarity metric in the data space, x is the sampled batch from training data, and $\phi$ and $\psi$ are parameters of encoder and decoder function. There are a variety of metrics that can be selected for the similarity metric. For example, if the $l_2$ norm is used to measure reconstruction error, then the objective function can be defined as:

$$\mathcal{L}_{AE}(\phi, \psi; x) = -\mathbb{E}_{x \sim \mathbb{P}_{data}(x)} \|x - h_\psi(f_\phi(x))\|^2$$

In another example, the function dist(•) can be expressed as dist(x,y)=x·log y+(1−x)log(1−y).

The choice of encoder $f_\phi(\cdot)$ and decoder $h_\psi(\cdot)$ can vary across different tasks. Although LSTM autoencoders are used herein, to handle inputs in the form of sequences, it should be understood that different selections for the encoder and decoder are also contemplated.

In the present embodiments, autoencoding is applied to map the input graph G to a latent space, providing a low-dimensional representation of the input. A GAN generator is used in block 106 to form a fake sample representation. GANs build an adversarial training platform for two functions, referred to herein as the generator $g_\theta(\cdot)$ and the discriminator $d_w(\cdot)$. The two functions are used in a minimax process:

$$\min_\theta \max_w \mathbb{E}_{x \sim \mathbb{P}_{data}(x)}[\log d_w(x)] + \mathbb{E}_{z \sim \mathbb{P}_g(z)}[\log(1 - d_w(g_\theta(z)))]$$

The generator $g_\theta(\cdot)$ maps noise (e.g., Gaussian noise) to the input space as closely as true data would be mapped, while the discriminator $d_w(x)$ represents the probability that a given sample x comes from actual data, rather than the noise. Here, $g_\theta$ is a differentiable function represented by a multilayer perceptron with the parameter $\theta$, and $d_w(x)$ is a differentiable function represented by a multilayer perceptron with the parameter w. The discriminator aims to distinguish the real data distribution $\mathbb{P}_{data}(x)$ from the fake sample distribution $\mathbb{P}_g(z)$, where $z \sim \mathcal{N}(0, \mathbb{I})$. An Earth-Mover distance metric can be used, such that the problem is expressed as:

$$\min_\theta \max_{w \in \mathcal{W}} \mathbb{E}_{x \sim \mathbb{P}_{data}(x)}[\log d_w(x)] - \mathbb{E}_{z \sim \mathbb{P}_g(z)}[d_w(g_\theta(z))]$$

The Lipschitz constraint $w$ is kept by clipping the weights on the discriminator within a compact space [−c, c].

The discriminator updates when comparing the latent space from the autoencoding and from the generative adversarial network generator. Block 108 concurrently updates the autoencoder and the discriminator and processing returns to block 104, until the latent space provided by the autoencoder provides an optimal embedding for the nodes of the network in block 110.

The joint use of the autoencoder and the generative adversarial network trains each part separately with dedicated training objectives. The autoencoder can be trained by individually minimizing the negative log-likelihood of reconstruction, which is indicated by cross entropy loss in the implementation:

$$\mathcal{L}_{AE}(\phi, \psi) = -\log p_\psi(x|e)$$

where x is the sampled batch from training data, e is an embedded latent representation of x and is also a positive sample for the discriminator, and $\phi$ and $\psi$ are parameters of encoder and decoder function. During training of the autoencoder, only the encoder and the decoder are updated, with the generative adversarial network not being included.

The generative adversarial network is trained with separate generator and discriminator:

$$\min_G \mathcal{L}_G(G) = \min_G \mathbb{E}_{\tilde{e} \sim \mathbb{P}_g}[D(\tilde{e})]$$

$$\min_D \max_\phi \mathcal{L}_D(D, \phi) = \min_D \max_\phi \mathbb{E}_{e \sim \mathbb{P}_r}[D(e)] - \mathbb{E}_{\tilde{e} \sim \mathbb{P}_g}[D(\tilde{e})]$$

where $\tilde{e}$ is the output of the generator with noise input. The loss function of the generator comes from the discriminator D's output, when feeding the discriminator with fake samples generated by the generator G. The variable e is an embedded latent representation of x. $\mathbb{E}$ denotes an expectation, $\mathbb{P}_r$ is the real data distribution, and $\mathbb{P}_g$ is the fake sample distribution.

The update of the discriminator takes place in two steps, using real data and fake samples. During the real data training step, a loss function is backpropagated given by the discriminator D to the encoder network to update its parameters $\phi$ simultaneously. As the generative adversarial network converges to a Nash equilibrium, the latent representation of the autoencoder approaches optimality.

The use of the GAN as a complementary regularizer with the autoencoder can guide the extraction of information about the data and provides more robust discrete-space representation learning that can address the overfitting problem that can arise from sparsely sampled walks on a network. This joint architecture uses dedicated for the GAN discriminator and for the autoencoder.

As noted above, the autoencoder can be trained by minimizing the negative log likelihood of reconstruction, indicated by cross entropy loss in the implementation $\mathcal{L}_{AE}(\phi, \psi; x)$. When training the autoencoder, the encoder and decoder are updated and a locality-preserving loss function, which preserves the locality property of the network structure to ensure that adjacent vertices remain in close proximity, is minimized:

$$\mathcal{L}_{LE}(\phi; x) = \sum_{1 \leq i < j \leq n} \|f_\phi(x^{(i)}) - f_\phi(x^{(j)})\|^2 \varphi_{ij}$$

where $\varphi_{ij}$ represents the elements of a matrix $\varphi$, representing the weight between two nodes in the network.

The GAN generator and GAN discriminator can be trained separately. The cost function for the generator can be defined as:

$$\mathcal{L}_{GEN}(\theta;x,z) = \mathbb{E}_{x \sim \mathbb{P}_{data}(x)}[d_w(f_\phi(x))] - \mathbb{E}_{z \sim \mathbb{P}_g(z)}[d_w(g_\theta(z))]$$

The cost function for the discriminator can be defined as:

$$\mathcal{L}_{DIS}(w;x,z) = -\mathbb{E}_{x \sim \mathbb{P}_{data}(x)}[d_w(f_\phi(x))] + \mathbb{E}_{z \sim \mathbb{P}_g(z)}[d_w(g_\theta(z))]$$

The present embodiments jointly minimize the autoencoder reconstruction error and the locality preserving loss in an adversarial training process.

The parameters for the autoencoder ($\psi$ and $\phi$), the GAN generator ($\theta$), and the GAN discriminator (w) are jointly optimized according to the locality-preserving loss process. The update of the parameters in block 108 thus solves a joint optimization problem with an exemplary objective function of:

$$\mathcal{L}_{joint}(\phi,\psi,\theta,w) = \mathcal{L}_{AE}(\phi,\psi;x) + \lambda_1 \mathcal{L}_{LE}(\phi;x) + \lambda_2 W(\mathbb{P}_\phi(x), \mathbb{P}_\theta(z))$$

The term $W(\bullet)$ is the dual of the Earth Mover distance between $\mathbb{P}_\phi(x)$ and $\mathbb{P}_\theta(z)$. In an example using a family of functions that are all K-Lipshitz for some value of K, the value of $W(\bullet)$ can be expressed as:

$$W(\mathbb{P}_\phi(x), \mathbb{P}_\theta(z)) \propto \max_{w \in \mathcal{W}} \mathbb{E}_{x \sim \mathbb{P}_{data}(x)}[d_w(f_\phi(x))] - \mathbb{E}_{z \sim \mathbb{P}_g(z)}[d_w(g_\theta(z))]$$

The parameter $\lambda_1$ represents the relative strength between the locality-preserving constraint and the autoencoder constraint. The higher $\lambda_1$ is, the larger the gradient from the locality-preserving constraint. The parameter $\lambda_2$ represents the relative strength of minimizing the distributions between the learned representations from the encoder function and the representations from the continuous generator model.

Figure 2:
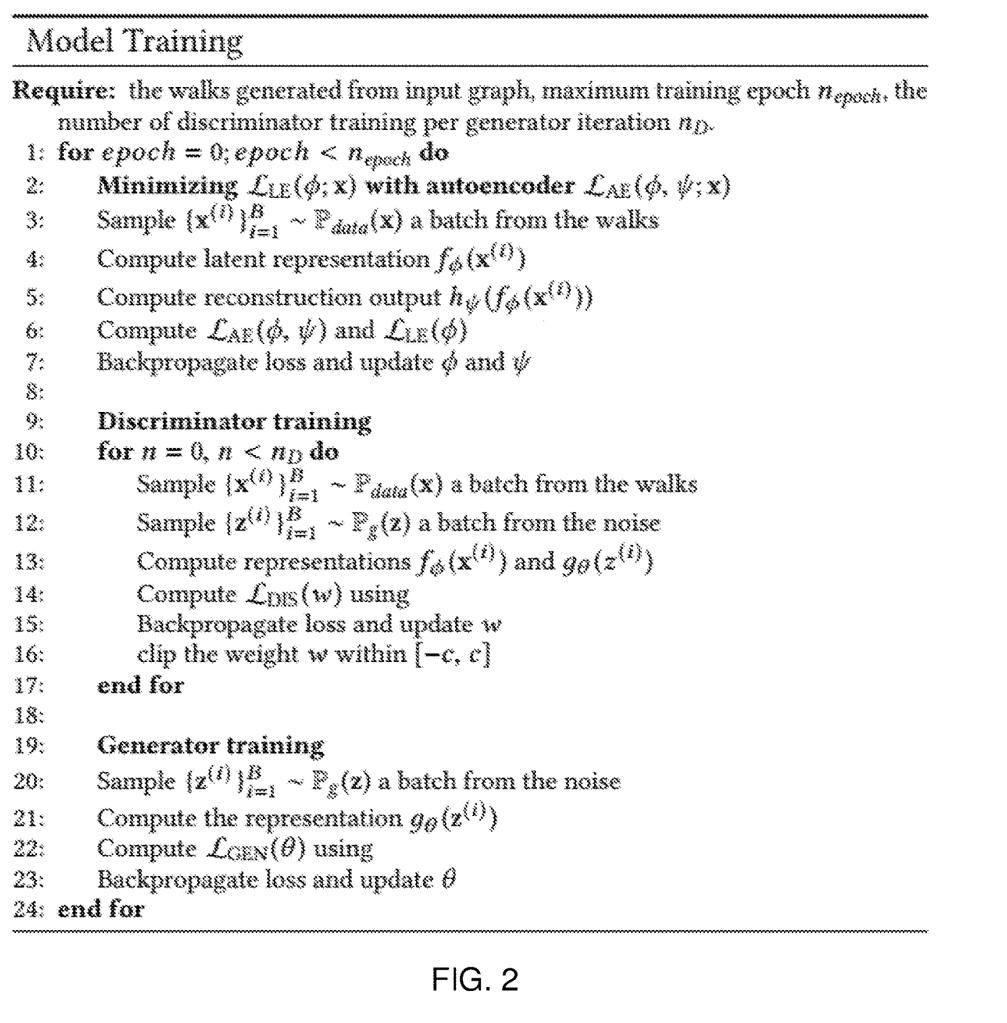
FIG. 2 is a block of pseudo-code that describes model training for an autoencoder, a generator, and a discriminator model in accordance with an embodiment of the present invention.

Referring now to FIG. 2, pseudo-code for training autoencoder and GAN models is shown. This material is described in greater detail below with respect to FIGS. 3-6.

Figure 3:
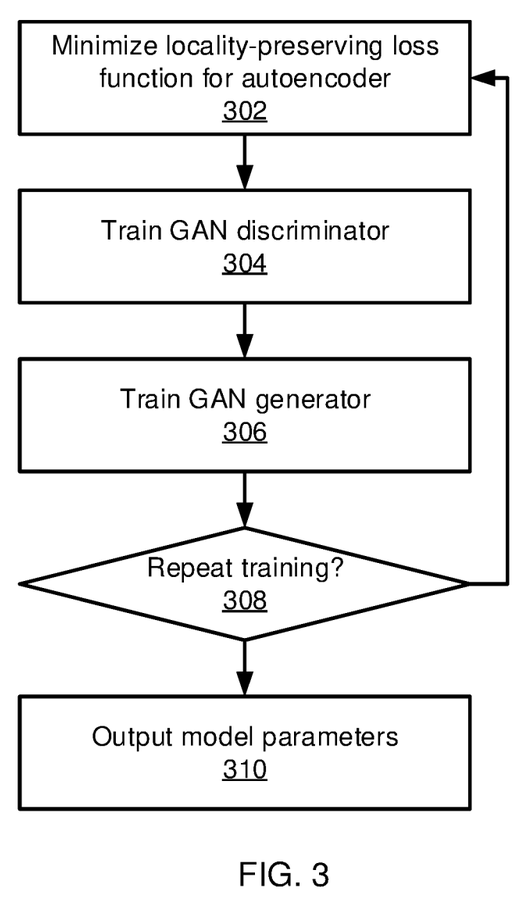
FIG. 3 is a block/flow diagram of joint model training for an autoencoder, a generator, and a discriminator model in accordance with an embodiment of the present invention.

Referring now to FIG. 3, additional detail on the update of the autoencoder, GAN discriminator, and GAN generator in block 108 is shown. Block 302 attempts to minimize the loss function $\mathcal{L}_{LE}$, which preserves the locality property of the network structure, using the autoencoder parameters. This process computes a latent representation of the network and then reconstructs the network from the latent representation. The loss is backpropagated through the autoencoder to update the parameters $\phi$ and $\psi$, as will be described in further detail below.

Block 304 trains the GAN discriminator by sampling the actual data as well as random noise and computes respective representations of each. The discriminator cost function $\mathcal{L}_{DIS}$ is computed and backpropagated through the discriminator to update the parameter w, with appropriate clipping.

Block 306 trains the GAN generator by sampling noise and computing a corresponding representation. The generator loss function $\mathcal{L}_{GEN}$ is computed and backpropagated through the generator to update the parameter $\theta$.

Block 308 determines whether training should be repeated. This can be set according to a parameter such as $n_{epoch}$, which determines the number of repetitions, but it should be understood that other measures may be used instead, such as model convergence. If block 308 determines that training should be repeated, then the process returns to block 302. If not, block 310 outputs the final model parameters. The present embodiments thus use block coordinate descent to alternate between optimizing the different parts of the model.

Figure 4:
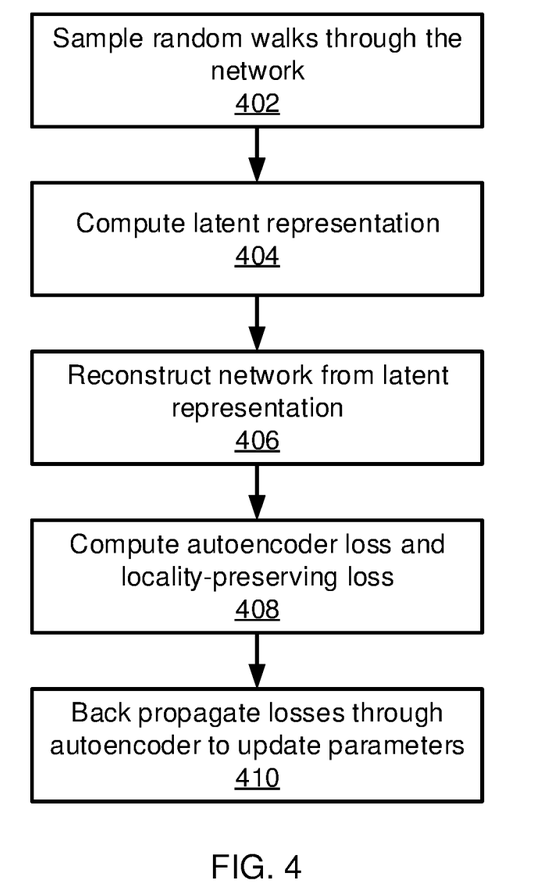
FIG. 4 is a block/flow diagram of training an autoencoder model in accordance with an embodiment of the present invention.

Referring now to FIG. 4, additional detail on the minimization of the locality-preserving loss in block 302 is shown. Block 402 samples random walks through the network to generate the sample set $\{x^{(i)}\}_{i=1}^B \sim \mathbb{P}_{data}(x)$, where B is the number of training samples. This can be performed a single time (as shown in FIG. 1) or can be performed repeatedly (as would be the case in FIGS. 3-4). Alternatively, a large set of random walks can be generated in block 102 and then sets of samples from the large set can be selected in block 402.

Block 404 computes a latent representation of the network based on the samples, applying the function $f_\phi(x^{(i)})$ to the samples. Block 406 then reconstructs the network based on the latent representation, applying the function $h_\psi(f_\phi(x^{(i)}))$. Based on these two outputs, block 408 computes a loss function $\mathcal{L}_{AE}$ for the autoencoder and a locality-preserving loss function $\mathcal{L}_{LE}$. The loss functions are used for backpropagation in the autoencoder neural network to update the parameters φ and ψ. In particular, backpropagation is performed using derivatives of $\mathcal{L}_{joint}$:

$$\nabla_\phi \mathcal{L}_{joint} = \\ \lambda_1 \nabla_\phi \sum_{1 \leq i \leq j \leq n} \|f_\phi(x^{(i)}) - f_\phi(x^{(j)})\|^2 \cdot \varphi_{ij} - \nabla_\phi \mathbb{E}_{x \sim \mathbb{P}_{data}(x)}[dist(x, h_\psi(f_\phi(x)))] + \\ \lambda_2 \nabla_\phi \mathbb{E}_{x \sim \mathbb{P}_{data}(x)}[d_w(f_\phi(x))] \nabla_\psi \mathcal{L}_{joint} = \\ -\nabla_\psi \mathbb{E}_{x \sim \mathbb{P}_{data}(x)}[dist(x, h_\psi(f_\phi(x)))]$$

Figure 5:
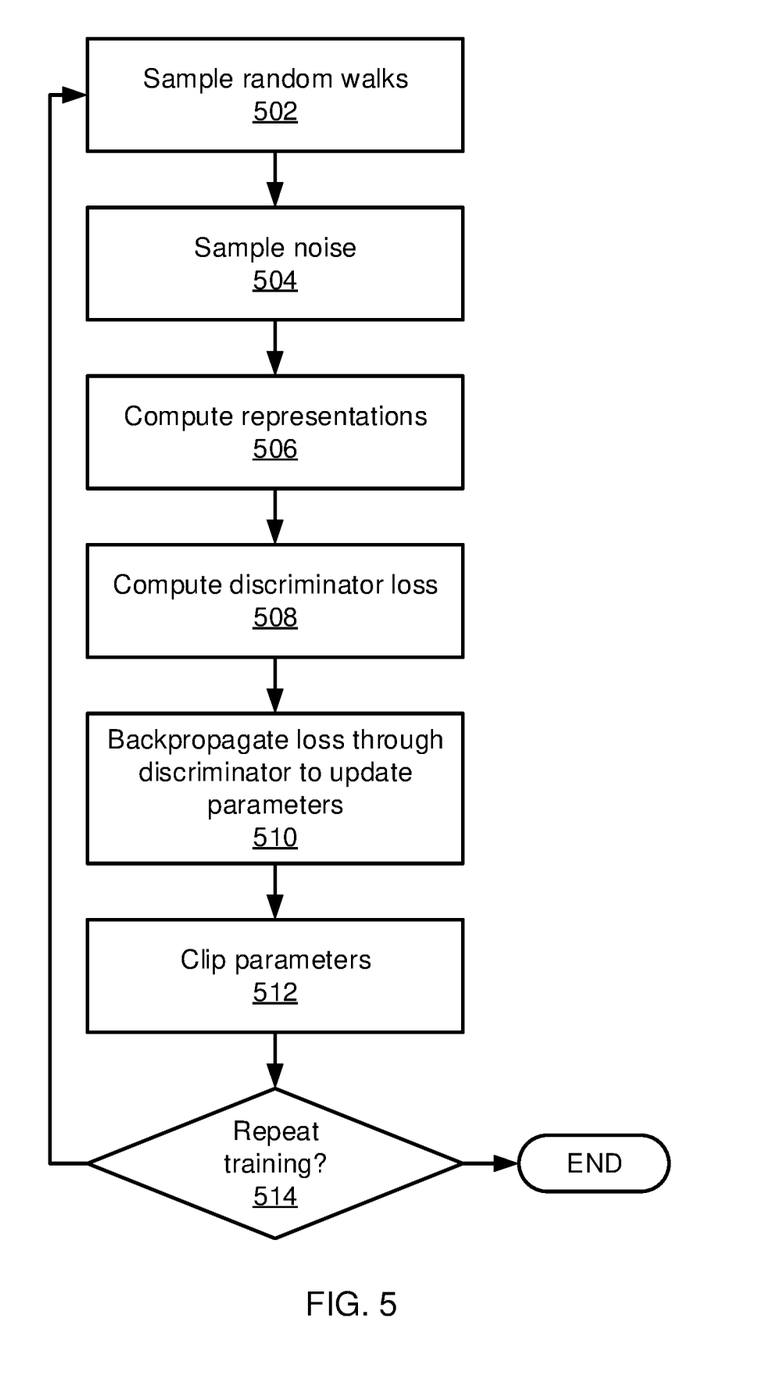
FIG. 5 is a block/flow diagram of training a discriminator model in accordance with an embodiment of the present invention.

Referring now to FIG. 5, additional detail on training the GAN discriminator in block 304 is shown. Block 502 samples the random walks $x^{(i)}$ and block 504 samples noise $z^{(i)}$. Block 506 computes latent representations $f_\phi(x^{(i)})$ and $g_\theta(z^{(i)})$ for each set of samples. Block 508 computes a discriminator loss $\mathcal{L}_{DIS}$ based on the latent representations. Block 510 backpropages the loss through the discriminator to update the parameter w, which block 512 clips to be within a range [−c, c]. In particular, backpropagation is performed using the derivative:

$$\nabla_w \mathcal{L}_{joint} = -\lambda_2 \nabla_w \mathbb{E}_{x \sim \mathbb{P}_{data}(x)}[d_w(f_\phi(x))] + \lambda_2 \nabla_w \mathbb{E}_{z \sim \mathbb{P}_G(z)}[d_w(g_\theta(z))]$$

Block 514 determines whether the discriminator training should be repeated, for example by determining whether a maximum number of repetitions $n_D$ has been reached or whether the discriminator model has converged. If another repetition is called for, processing returns to block 502. If not, training the discriminator ends.

Figure 6:
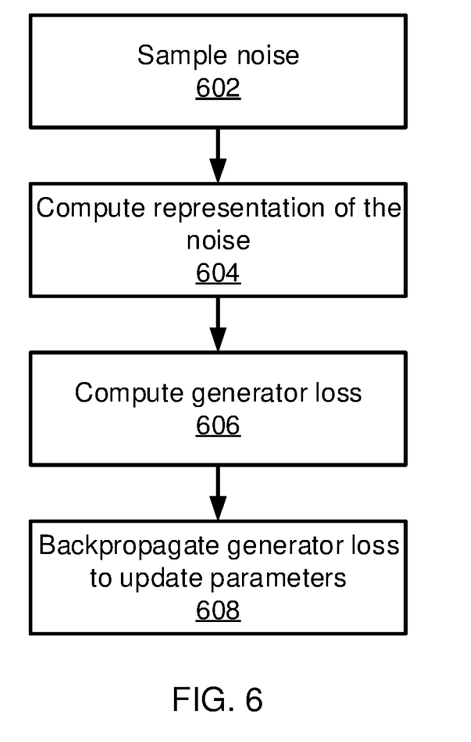
FIG. 6 is a block/flow diagram of training a generator model in accordance with an embodiment of the present invention.

Referring now to FIG. 6, additional detail on training the GAN generator in block 306 is shown. Block 602 samples noise $z^{(i)}$ and block 604 computes a latent representation based on the noise samples, $g_\gamma(z^{(i)})$. Block 606 computes the generator loss $\mathcal{L}_{GEN}$. Block 608 backpropagates the generator loss through the generator, which may for example be implemented as a multilayer perceptron, and updates the parameter θ. In particular, backpropagation is performed using the derivative:

$$\nabla_\theta \mathcal{L}_{joint} = -\lambda_2 \nabla_\theta \mathbb{E}_{z \sim \mathbb{P}_g(z)}[d_w(g(z))]$$

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
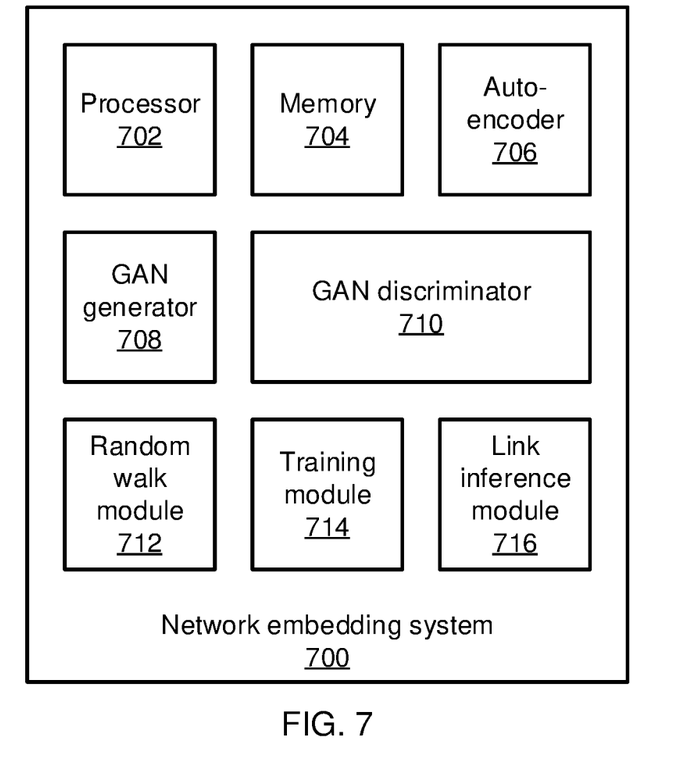
FIG. 7 is a block diagram of a network embedding system in accordance with an embodiment of the present invention.

Referring now to FIG. 7, a network embedding system 700 is shown. The network embedding system 700 includes a hardware processor 702 and memory 704. The network embedding system 700 further includes one or more functional modules that may be implemented as software that is stored in memory 704 and executed by hardware processor 702. In other embodiments, the functional modules may be implemented as one or more discrete hardware components in the form of, e.g., application-specific integrated chips or field programmable gate arrays.

The system 700 includes an autoencoder 706 that embeds an input network graph into a latent representation of the graph in some appropriate space. The autoencoder 706 is jointly trained with a GAN generator 708 and a GAN discriminator by the training module 714, using samples of the network generated by random walk module 712. A link inference module 716 is included to, for example, predict missing links between nodes in the network based on the final representation. This is just one application of the present principles and provides a specific improvement to social network technologies, where missing links can represent connections between people who know one another. A superior representation of the network will generate more accurate link prediction results. In the context of a social network embodiment, this may represent a more accurate suggestion of interpersonal connections, but it should be understood that the present embodiments can be extended to include any application of link prediction, network reconstruction, etc.

Figure 8:
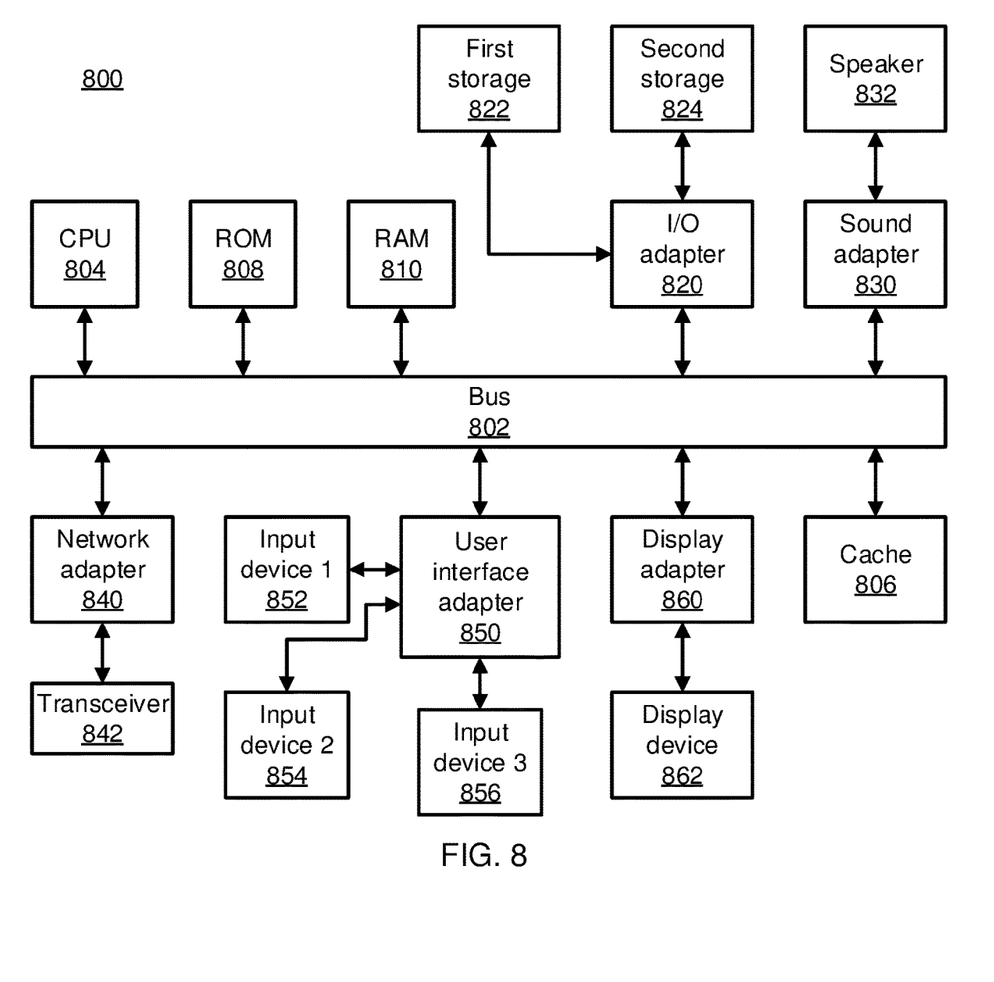
FIG. 8 is a block diagram of a processing system in accordance with an embodiment of the present invention.

Referring now to FIG. 8, an exemplary processing system 800 is shown which may represent the network embedding system 700. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for embedding a network in a latent space, comprising:
generating a representation of an input network graph in the latent space using an autoencoder model;
generating a representation of a set of noise samples in the latent space using a generator model;
discriminating between the representation of the input network graph and the representation of the set of noise samples using a discriminator model;
jointly training the autoencoder model, the generator model, and the discriminator model, using a processor device, by minimizing a joint loss function that includes parameters for each model, wherein the joint loss function is defined as:

$$\mathcal{L}_{joint}(\phi,\psi,\theta,w) = \mathcal{L}_{AE}(\phi,\psi;x) + \lambda_1 \mathcal{L}_{LE}(\phi;x) + \lambda_2 W(\mathbb{P}_\phi(x), \mathbb{P}_\theta(z))$$

where $\phi$ and $\psi$ are parameters of the autoencoder model, $\theta$ is a parameter of the generator model, w is a parameter of the discriminator model, $\mathcal{L}_{AE}$ is a loss function for the autoencoder, $\mathcal{L}_{LE}$ is a locality-preserving loss function, W is the dual of the Earth Mover distance measure between $\mathbb{P}_\phi(x)$ and $\mathbb{P}_\theta(z)$, $\mathbb{P}_\phi(x)$ is a distribution of the representations from the autoencoder model and, $\mathbb{P}_\theta(z)$ is a distribution of the representations from the generator model, $\lambda_1$ is a parameter that sets the relative strength between the locality-preserving constraint and the auto-encoder constraint, and $\lambda_2$ is a parameter that sets the relative strength of minimizing the distributions between $\mathbb{P}_\phi(x)$ and $\mathbb{P}_\theta(z)$; and
generating a final representation of the input network graph using the trained autoencoder model.

2. The method of claim 1, further comprising sampling random walks of the network graph.

3. The method of claim 2, wherein generating the representation of the input network graph uses the sampled random walks as input to the autoencoder model.

4. The method of claim 1, further comprising generating a reconstructed network graph using the autoencoder model and the representation of the input network graph.

5. The method of claim 4, further comprising computing an autoencoder loss and a locality-preserving loss based on the input network graph and the reconstruction of the input network graph.

6. The method of claim 5, further comprising training the autoencoder model using the autoencoder loss and the locality-preserving loss.

7. The method of claim 1, wherein a parameter for the discriminator model is clipped to a maximum and minimum value.

8. The method of claim 1, further comprising inferring missing edges from the final representation of the input graph to provide a connection suggestion in a social network.

9. A system for embedding a network in a latent space, comprising:
an auto-encoder configured to generate a representation of an input network graph in the latent space using an autoencoder model and to generate a final representation of the input network graph after the autoencoder model has been trained;
a generator configured to generate a representation of a set of noise samples in the latent space using a generator model;
a discriminator configured to discriminate between the representation of the input network graph and the representation of the set of noise samples using a discriminator model; and
a training module comprising a processor configured to jointly train the autoencoder model, the generator model, and the discriminator model by minimizing a joint loss function that includes parameters for each model, wherein the joint loss function is defined as:

$$\mathcal{L}_{joint}(\phi,\psi,\theta,w) = \mathcal{L}_{AE}(\phi,\psi;x) + \lambda_1 \mathcal{L}_{LE}(\phi;x) + \lambda_2 W(\mathbb{P}_\phi(x), \mathbb{P}_\theta(z))$$

where $\phi$ and $\psi$ are parameters of the autoencoder model, $\theta$ is a parameter of the generator model, w is a parameter of the discriminator model, $\mathcal{L}_{AE}$ is a loss function for the autoencoder, $\mathcal{L}_{LE}$ is a locality-preserving loss function, W is the dual of the Earth Mover distance measure between $\mathbb{P}_\phi(x)$ and $\mathbb{P}_\theta(z)$, $\mathbb{P}_\phi(x)$ is a distribution of the representations from the autoencoder model and, $\mathbb{P}_\theta(z)$ is a distribution of the representations from the generator model, $\lambda_1$ is a parameter that sets the relative strength between the locality-preserving constraint and the auto-encoder constraint, and $\lambda_2$ is a parameter that sets the relative strength of minimizing the distributions between $\mathbb{P}_\phi(x)$ and $\mathbb{P}_\theta(z)$.

10. The system of claim 9, further comprising a random walk module configured to sample random walks of the network graph.

11. The system of claim 10, wherein the autoencoder uses the sampled random walks as input to the autoencoder model.

12. The system of claim 9, wherein the autoencoder is further configured to generate a reconstructed network graph using the autoencoder model and the representation of the input network graph.

13. The system of claim 12, wherein the training module is further configured to compute an autoencoder loss and a locality-preserving loss based on the input network graph and the reconstruction of the input network graph.

14. The system of claim 13, wherein the training module is further configured to train the autoencoder model using the autoencoder loss and the locality-preserving loss.

15. The system of claim 9, wherein a parameter for the discriminator model is clipped to a maximum and minimum value.

16. The system of claim 9, further comprising a link inference module configured to infer missing edges from the final representation of the input graph to provide a connection suggestion in a social network.

* * * * *